No. 828,080. PATENTED AUG. 7, 1906.
H. S. WILSON.
TYPE CASTING MACHINE.
APPLICATION FILED APR. 29, 1903.

Attest
Edw. L. Dillon
J. B. Megown.

Inventor:
H. S. Wilson
By Carr & Carr
Attys.

No. 828,080. PATENTED AUG. 7, 1906.
H. S. WILSON.
TYPE CASTING MACHINE.
APPLICATION FILED APR. 29, 1903.

Attest:
Edw. L. Dillon
J. B. Megown

Inventor:
H. S. Wilson,
by Carr & Carr,
Attys.

Fig. 3.

No. 828,080. PATENTED AUG. 7, 1906.
H. S. WILSON.
TYPE CASTING MACHINE.
APPLICATION FILED APR. 29, 1903.

Attest:
Edw. L. Dillon
J. B. Megown

Inventor:
H. S. Wilson,
by Carr & Carr,
Attys.

No. 828,080. PATENTED AUG. 7, 1906.
H. S. WILSON.
TYPE CASTING MACHINE.
APPLICATION FILED APR. 29, 1903.

Attest:
Edw. L. Dillon
J. B. Megown.

Inventor:
H. S. Wilson,
By Cant & Cant,
Att'ys.

No. 828,080. PATENTED AUG. 7, 1906.
H. S. WILSON.
TYPE CASTING MACHINE.
APPLICATION FILED APR. 29, 1903.

Witnesses:
G. A. Pennington
J. B. Megown

Inventor:
H. S. Wilson,
By Cam & Cam
Attys.

UNITED STATES PATENT OFFICE.

HERBERT STERLING WILSON, OF KIRKWOOD, MISSOURI, ASSIGNOR TO INLAND TYPE FOUNDRY, OF ST. LOUIS, MISSOURI, A CORPORATION.

TYPE-CASTING MACHINE.

No. 823,080.     Specification of Letters Patent.     Patented Aug. 7, 1906.

Application filed April 29, 1903. Serial No. 154,902.

*To all whom it may concern:*

Be it known that I, HERBERT STERLING WILSON, a citizen of the United States, and a resident of the city of Kirkwood, county of St. Louis, and State of Missouri, have invented certain new and useful Improvements in Type-Casting Machines, of which the following is a specification.

My invention relates to machines for making type; and it consists in the parts and in the arrangements and in the combinations of parts hereinafter claimed.

In the accompanying drawings, which form part of this specification, and wherein like symbols refer to like parts wherever they occur, Fig. 5ᵃ is a vertical sectional detail through the mold-cover and its guideway. Fig. 5ᵇ is a perspective view of one of the wedges for adjusting the mold-cover guides.

Figures 8, 9:
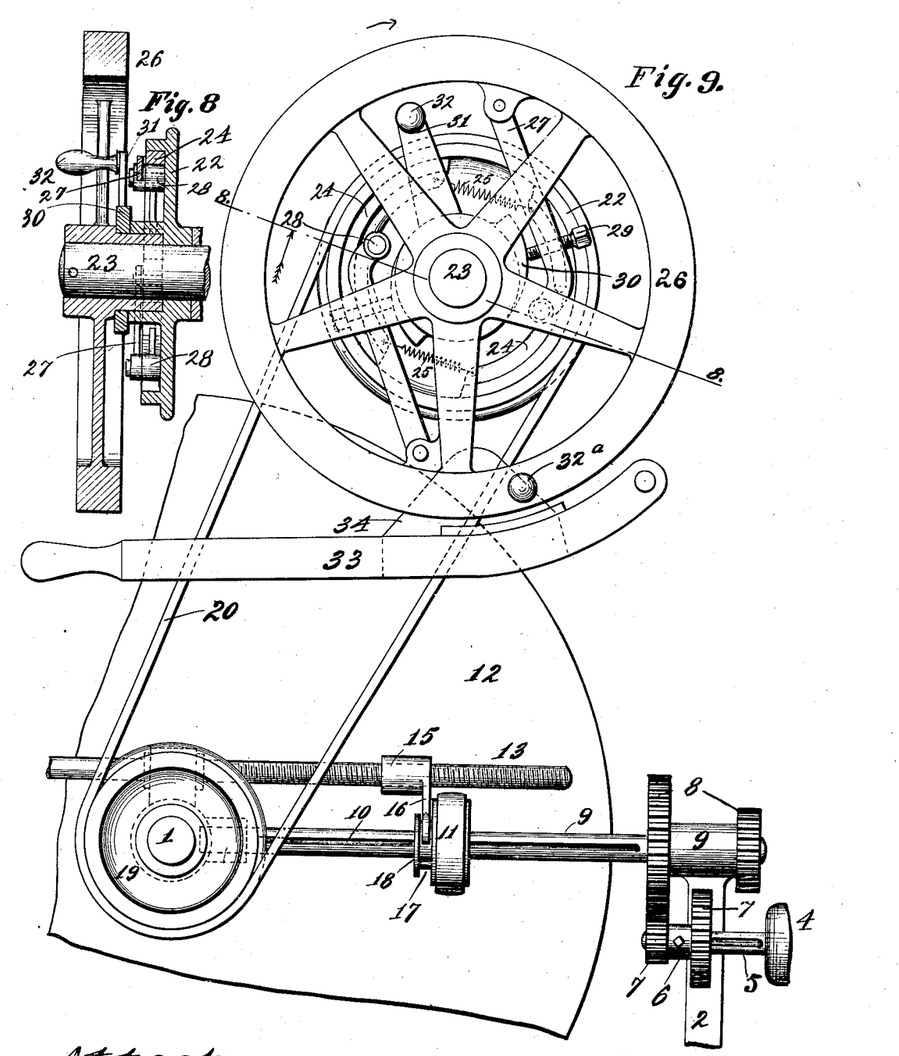
Fig. 8 is a cross-sectional detail of the friction-clutch on the line 8 8 of Fig. 9.
Fig. 9 is a vertical detail of the friction-clutch and power-transmitting devices.
Figure 10:
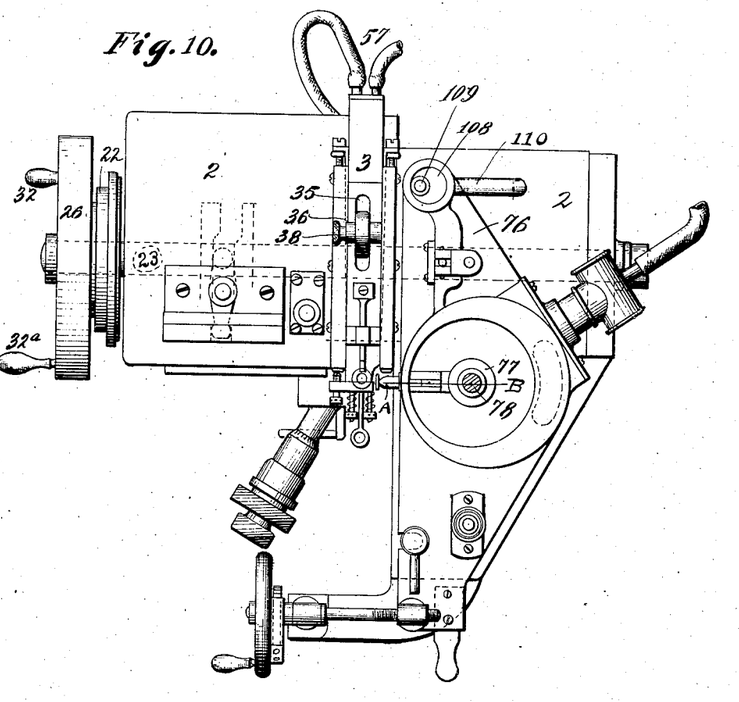
Fig. 10 is a plan view of the machine with certain parts removed.
Figures 11, 12:
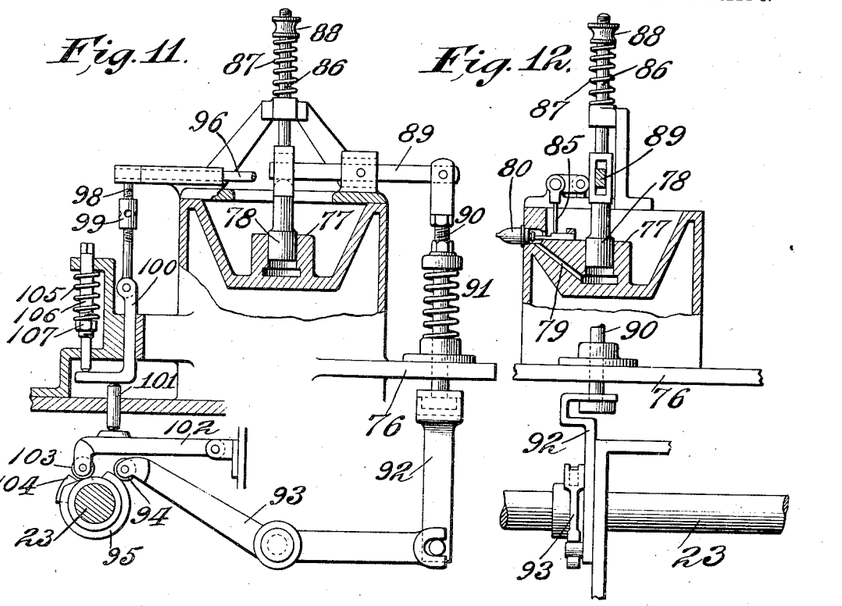
Fig. 11 is a vertical view, mostly in elevation, of the pump mechanism.
Fig. 12 is a vertical view, mostly in elevation, of the pump mechanism in a plane at right angles to the view of Fig. 11.
Figures 13, 14:
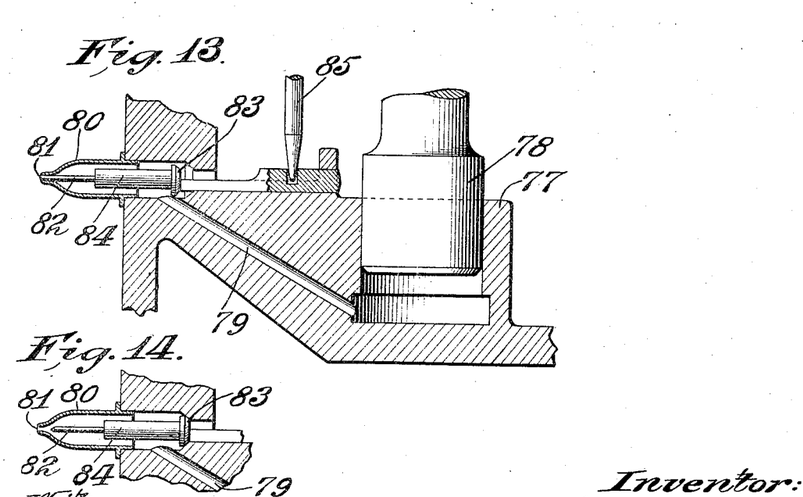
Figs. 13 and 14 are detail views of the pump-actuating mechanism.

The main shaft 1 of the machine is journaled horizontally in the main frame 2 and preferably is arranged transversely to the line of motion of the mold-cover 3. The mold-cover 3 carries a spring 3ᵃ, the type-ejecting plunger 3ᵇ, arranged to coöperate with an anvil 3ᶜ, and a type-gripping jaw 3ᵈ, all of which are more fully described in a pending application of William A. Schraubstadter, Serial No. 154,130, filed April 24, 1903. This main shaft is driven by any suitable motor—as, for instance, by means of an electric motor 4, whose shaft 5 (see Fig. 9) is slotted lengthwise and has a sleeve 6, movably secured thereto by a feather or spline fitting in said slot. This sleeve has two pinions of different diameters at its respective ends, which pinions are arranged to intermesh with corresponding pinions 8, fixed on a counter-shaft 9. The pinions on the counter-shaft are farther apart than the sleeve-pinions, so that only one pair will intermesh at a time, whereby the speed of the counter-shaft is greater or less, according as its smaller or larger pinion is in working engagement with a motor-pinion.

The counter-shaft has a slot or spline 10 extending lengthwise thereof and has a splined or slotted friction-wheel 11, arranged to turn with the counter-shaft and still be free to move longitudinally thereof. The main shaft is arranged at right angles to the counter-shaft and has a friction-disk 12 fixed thereto in position for the friction-wheel 11 to bear against its face, and thereby transmit motion from the counter-shaft to said main shaft.

In order to regulate the speed of the main shaft, a threaded rod 13 is journaled in the framework parallel with the counter-shaft. This rod has a hand-wheel 14 at its outer end in convenient reach for manipulation and has a threaded nut 15 working on its threaded end. This threaded nut has a forked arm 16 projecting therefrom to enter an annular groove 17 provided therefor in the periphery of the extending hub 18 of the friction-wheel. As the forked arm of the nut straddles the hub, it is prevented from turning with its rod 13, and consequently the turning of said rod causes the endwise movement of the nut, which carries with it the friction-wheel 11, and thereby changes radially of the disk 12 the point of its engagement with the friction-wheel. By this arrangement the power is transmitted, through the intermediate connecting or transmitting devices, from the motor to the main shaft 1 of the machine. The main shaft has a pulley 19 fixed thereon, and over this pulley passes an endless belt 20, which is kept taut by any suitable belt-tightener 21, which is omitted from the detail view of Fig. 9. This belt 20 also passes around a second pulley 22 on a shaft 23, journaled in the farmework parallel with the main shaft. This last-mentioned shaft 23 has fixed thereto a number of edge cams and is hereinafter denominated the "cam-shaft." The pulley 22 is mounted loosely on the cam-shaft, but transmits motion thereto by means of a friction-clutch within the control of the operator. For this purpose the face of the pulley is undercut, and within the overhanging rim thereof are arranged curved friction-blocks 24, adapted to bear against the inner surface of said rim. The ends of these friction-blocks are connected together by tension-springs 25, which tend to hold the blocks out of contact with the pulley. Fixed to the cam-shaft is a momentum-wheel 26, which has inwardly-extending arms 27 pivoted near its periphery. The free ends of these arms have pins or projections 28, which extend laterally into position to bear against the backs or inner surfaces of the respective friction-blocks. Each of the pivoted arms has a threaded bolt 29 extending radially therethrough, so as to be adjustable. Arranged in the same plane with said bolts is a cam-disk 30, loosely journaled on the cam-shaft. The periphery of this disk has an eccentric projection for each bolt and arranged to coöperate therewith. This disk thus constitutes a cam and is provided with a radial arm 31, having a handpiece 32 on its outer end.

When the disk is turned in one direction, its cam-surfaces bear against the respective bolts, and thereby cause the arms to swing outwardly and force their friction-plates against the inner rim of the belt-pulley, in consequence of which the cam-shaft is brought into frictional engagement with the belt-pulley and moves therewith. When the disk is moved in the opposite direction, or when the disk is prevented from moving with the belt-pulley, the pressure is removed from the friction-blocks and the helical springs immediately pull the friction-blocks away from the belt-pulley, and thereby disengage the cam-shaft from said belt-pulley. The clutch thus described has the immediate advantage of being easily operated by hand while the machine is in full operation.

In order to quickly stop the machine when it is running rapidly, it is desirable to provide a friction-brake therefor. This friction-brake consists of a hand-lever 33, fulcrumed in the frame and having a portion thereof curved to conform to the periphery of the momentum-wheel. This lever has a piece 34 projecting therefrom in position to be moved into the path of the handle 32 of the friction-disk 30. Normally the hand-lever is out of contact with all of the moving parts of the machine; but when it is desired to stop the machine the free end of the hand-lever is raised so as to bring its projection 34 into position to obstruct the movement of the friction-disk and so as to have its curved friction-surface bear against the periphery of the momentum-wheel. The friction-clutch is thus automatically released simultaneously with the application of friction to the momentum-wheel, whereby the braking of the machine proper is effected simultaneously with the cutting off of the power therefrom.

In order that the mold-cover may reciprocate horizontally in guides provided therefor on the frame of the machine, said mold-cover has a vertical opening 37 therethrough, through which projects the arm or lever 36, whereby it is reciprocated. This arm has a transverse opening 37 therethrough, which opening is of a circular form at its lower portion and has a straight offset portion of less diameter extending upwardly. The mold-cover pin 38 is a cylindrical bar of proper size to pass through the circular portion of the opening 37, and its middle portion is flattened so as to allow it to extend up into the reduced portion of said opening. Said mold-cover pin 38 is thus locked in place, and its cylindrical ends project so as to overlap the upper surface of the mold-cover and coöperate with grooves or bearing-surfaces provided therefor on the mold-cover.

The lower end of the arm 36, which actuates the mold-cover, is pivoted on the end of a lever 39 near the bottom of the machine. This last-mentioned lever 39 has a strong spring 40 pressing downwardly against the end thereof to which the mold-cover-actuating arm is connected, and the other end of said lever projects outwardly in position to be actuated by the foot of the operator. When it is desired to remove the mold-cover for dressing, the actuating-arm is raised by the foot of the operator, thus leaving both his hands free for the proper manipulation of the mold-cover pin.

The mold-cover-actuating arm 36 has a yoke 41 straddling the cam-shaft 23. The two sides or legs of said yoke are offset laterally from each other and each is provided with a roller 42 for coöperation with a cam provided for it upon the cam-shaft. The two cams 43 44 are arranged at different longitudinal positions on said cam-shaft, so that each cam operates only upon one of said rollers. The cam 44, which causes the forward movement of the mold-cover, is arranged to have a long pause, and the cam which causes the backward movement thereof is arranged to have a short pause. By this arrangement the rotation of the cams causes the reciprocation of the mold-cover with definite intermissions of movement. The pauses thus provided for allow ample time for the other movements necessary in the formation and ejecting of the type. This actuating-arm is made in sections adjustably connected together, so as to vary the alinement of the sections with reference to each other and also vary the length of said arm. For this purpose the lower section has a screw or threaded bar 45 fixed in its upper end to project upwardly therefrom into a hollow projection or hub 46 at the lower end of the upper section. The lower surface of this projecting hub 46 has a concave surface which fits over the convex surface of a block 47, mounted on the screw and supported thereon by means of a nut 48, which works on the thread of the screw. By this arrangement the turning of the nut varies the length of the actuating-arm.

Pivotally mounted on the upper section of the actuating-arm on opposite sides of the shaft are links 49, whose lower ends are threaded and have nuts 50 working thereon. These links extend through laterally-projecting portions of the lower sections and are clamped thereto by means of the nuts. By this arrangement the alinement of the upper section with reference to the lower section is varied according to the adjustment of the nuts, the curved bearing of the sections against each other permitting such change of alinement.

Figures 5, 5A, 5B, 6, 7:
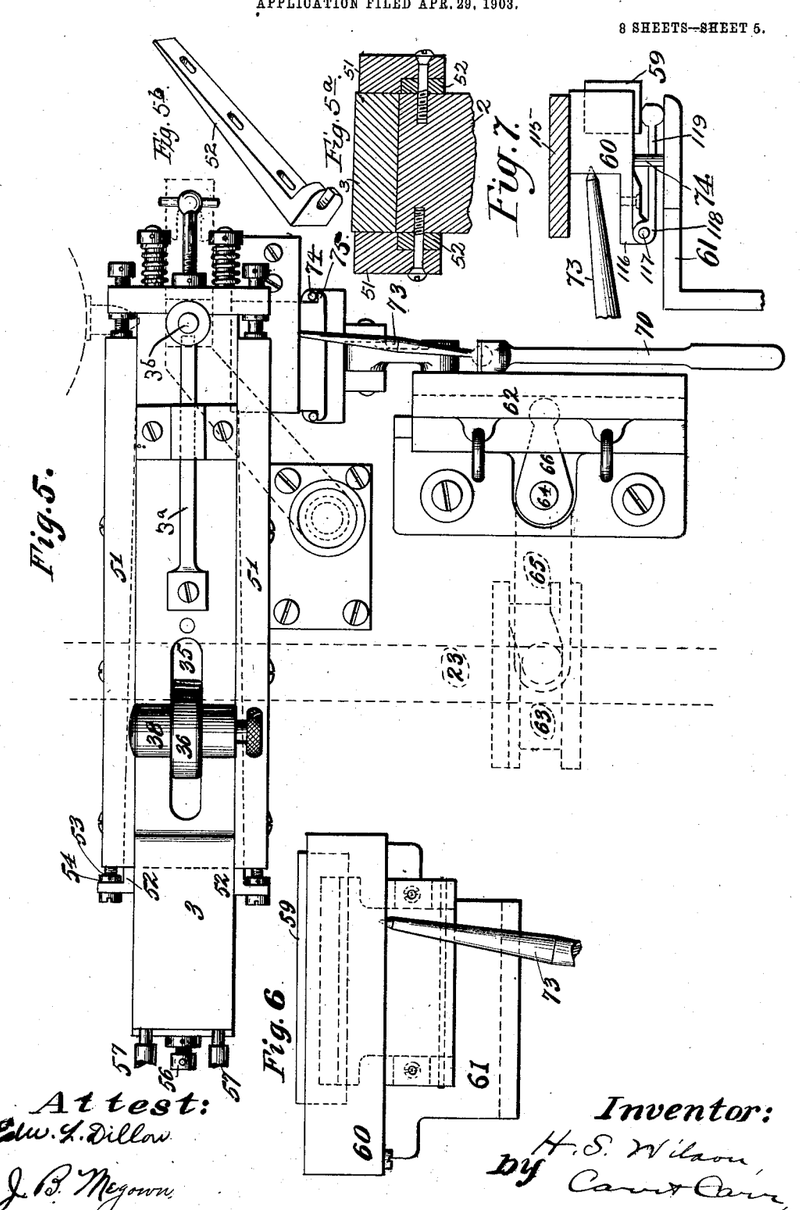
Fig. 5 is a plan view of the mold-cover and portion of the mechanism adjacent thereto.
Fig. 6 is a plan detail of a matrix-box and its carrier.
Fig. 7 is a detail end elevation of said matrix-box.

The guides for the mold-cover comprise long gibs or bars 51. The face of the upper portion of the gib next to the mold-cover is parallel therewith; but the lower portion of said face is set at a slight inclination to the line of motion of said mold-cover. (See Figs. 5ª and 5ᵇ.) Between the lower inclined portion of each of said gibs and the frame is an elongated wedge 52 with its end outturned. Extending through a hole in such outturned end is an adjusting-screw 53, which works in a threaded hole provided therefor in the end of the gib. By this arrangement each wedge may be adjusted to any desired position, and a set-nut 54 on its screw will hold it wherever adjusted.

Figure 4:
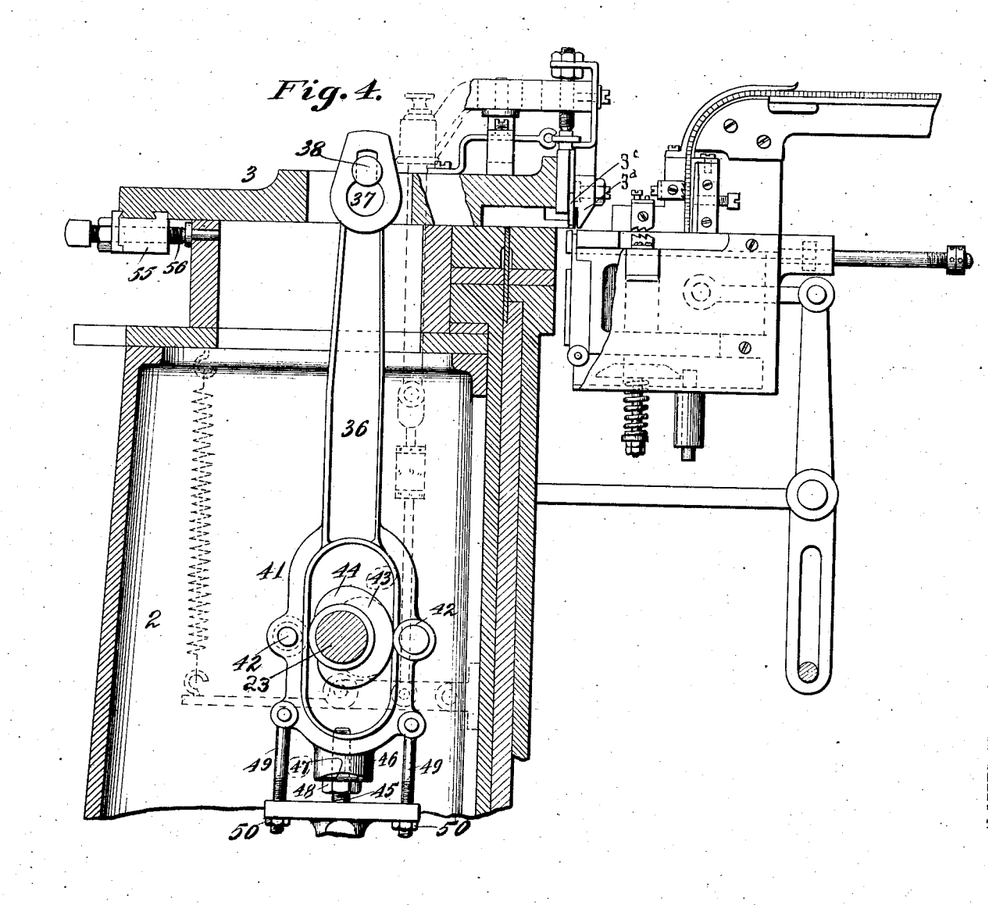
Fig. 4 is a longitudinal cross-section.

It is necessary to dress the surface of the mold-cover from time to time, and for this purpose it is desirable to make said mold-cover removable and have it made without projecting parts on the wearing-surfaces. For this purpose the rear end of the mold-cover is rabbeted transversely on its under side to secure thereto a downwardly-projecting block 55, made in two parts. (See Fig. 4.) This block has a threaded hole therethrough, through which extends a threaded bolt 56 in position to strike against an abutment-plate on the frame of the machine, and thereby limit the forward movement of the mold-cover. In accordance with common practice the mold-cover and the portions of the machine adjacent to the mold are made hollow and connected to the water-pipes 57 for cooling them.

Figure 1:
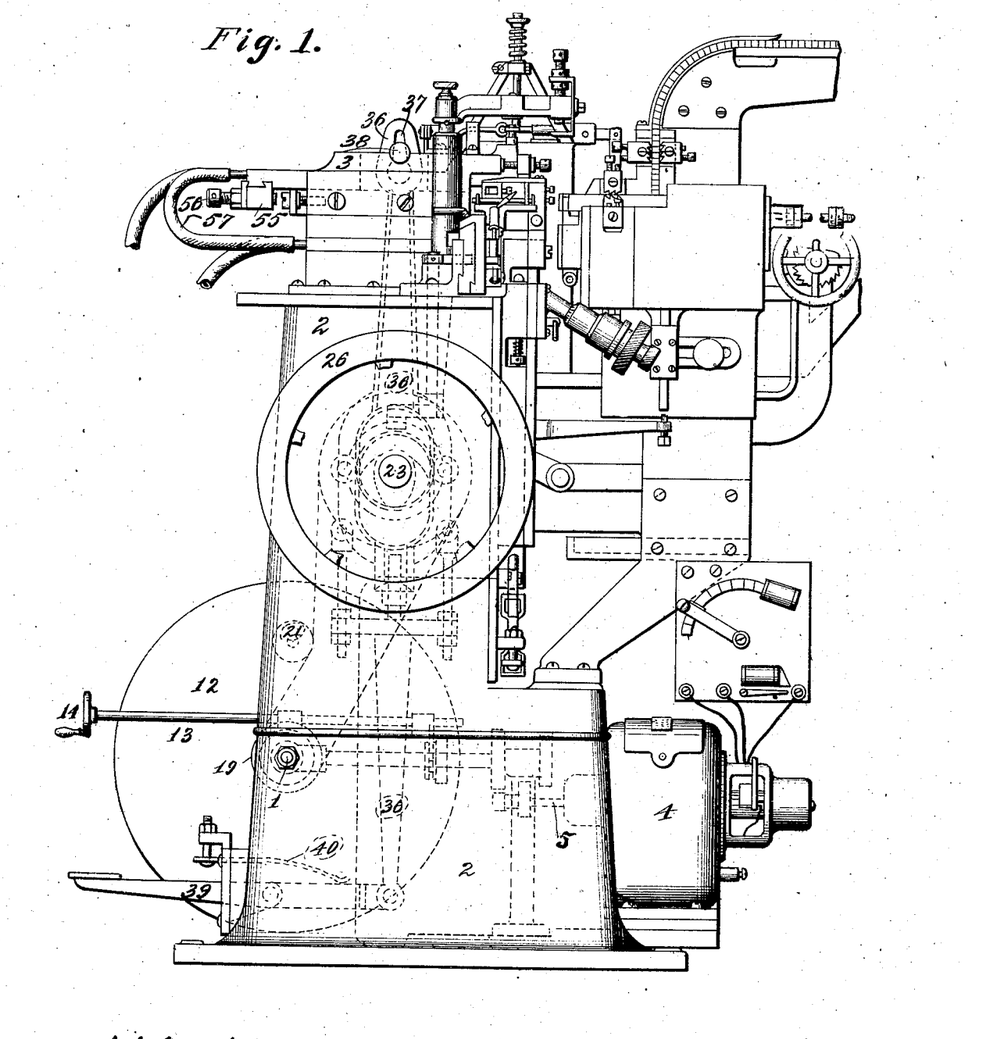
Figure 1 is a side elevation of my machine.
Figure 2:
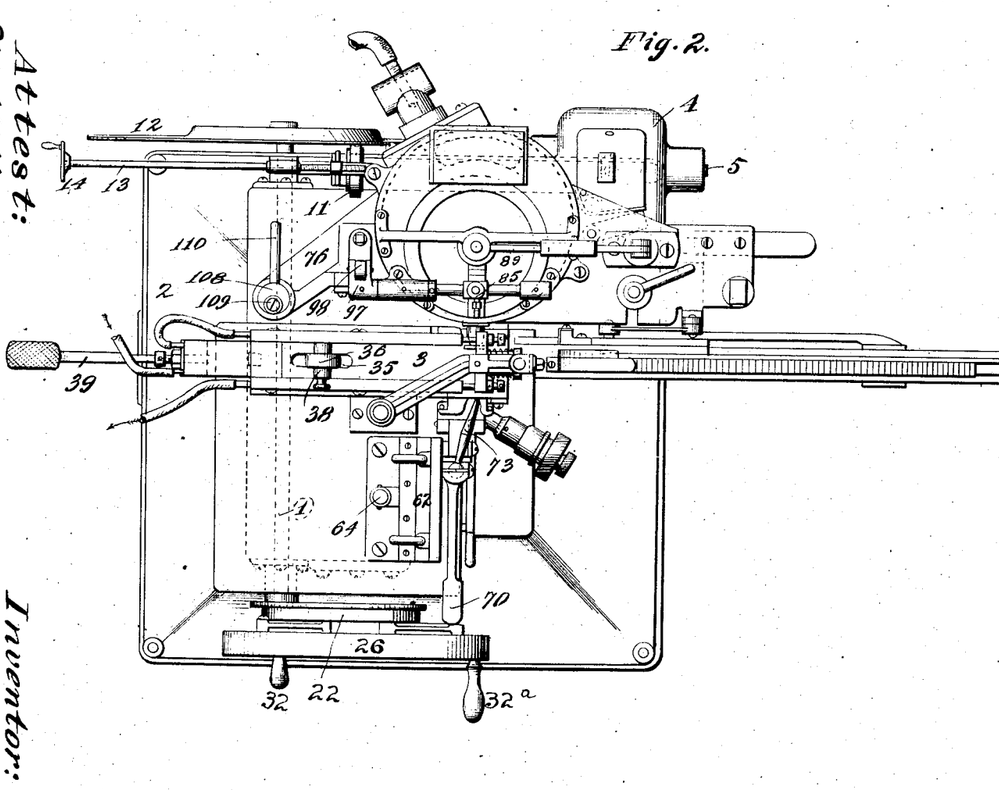
Fig. 2 is a plan thereof.
Figure 3:
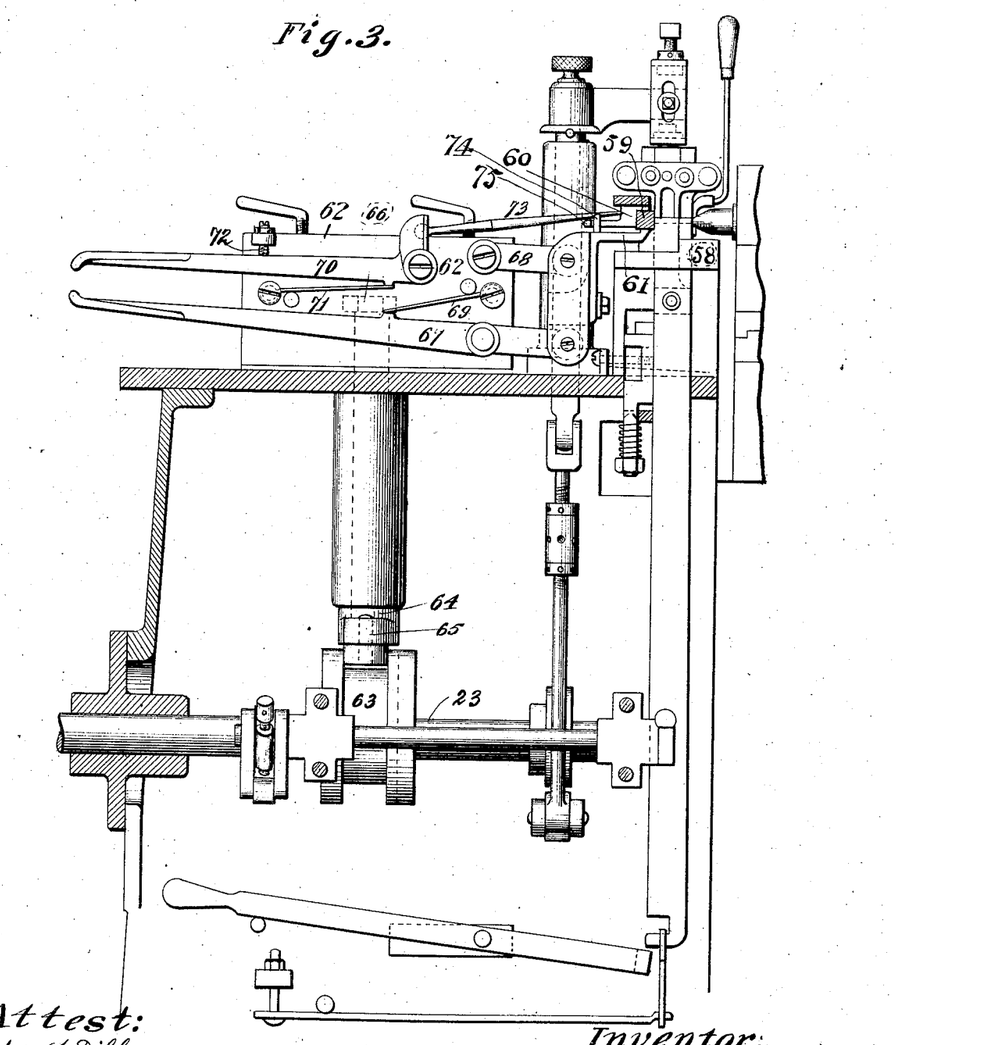
Fig. 3 is a vertical end view, partly in elevation and partly in section.

The mold 58 is of the usual construction, and the matrix 59 is mounted in a matrix-box 60, which is supported upon a matrix-carrier arm 61. This matrix-carrier arm is mounted upon a frame 62, arranged to slide in guides provided therefor in the main frame transverse to the line of motion of the mold-cover and arranged to be reciprocated by means of a cam 63 on the cam-shaft. For this purpose a vertically-arranged rock-shaft 64 (see Figs. 3 and 5) has an arm 65 fitting into a groove in the periphery of the cam 63 and a second arm 66 arranged to actuate the sliding frame. The lower portion of the matrix-carrier arm 61 is pivotally connected to the end of a hand-lever 67, which is fulcrumed on the sliding frame 62. An upper portion of this matrix-carrier arm is pivotally connected to said sliding frame by a link 68, said link being of equal length with the supporting end of said lever and parallel therewith, whereby the matrix-carrier arm will move vertically without canting.

Against the handle of the lever 67, which supports the matrix-carrier arm, bears a spring 69, provided therefor on said sliding frame. This sliding frame also carries a second hand-lever 70, arranged to coöperate with the above-mentioned hand-lever 67 for the convenient manipulation of the matrix-box and matrix. The sliding frame 62 also carries a spring 71 for bearing against it and an adjustable back-stop 72 for limiting its position. This last-mentioned lever has a thrust-bar 73 connected thereto by a ball-and-socket joint, and this thrust-bar bears upwardly and forwardly against the matrix-box on the matrix-carrier arm. The handles of the two hand-levers are far enough removed from the mold to remain cool, in consequence of which the matrix may be removed and replaced with another matrix without waiting for it or the other heated parts to cool off. The handles of the two hand-levers are arranged close enough together to be grasped by a single hand, whereby the pressure may be removed from the mold and the slide withdrawn by the hand which grasps said handles, and the other hand is left free to manipulate the matrix. Upon the matrix-carrier arm are two pins or projections 74, and upon the matrix-box are elongated offset projections 75, arranged to constitute hooks for interlocking with said pins during the return movement of the matrix-carrier arm. By reason of the loose mounting of the matrix-box and the upward, lateral, and longitudinal pressure thereon of the resilient parts said matrix-box is pressed into the angle formed by its abutments, which serve to position it with reference to the mold. This automatic positioning of the matrix-box occurs while the sliding frame is in its outer position. Consequently while the sliding frame is being moved inward to exert pressure on the matrix during the casting of the type there is no tendency of the matrix to tilt or cant from its proper position.

To the base of the mold is secured a piece 115, which projects above the matrix-box and constitutes the top stool therefor. The under side of this top stool is made smooth and flat, so that the upper face of the matrix-box will slide smoothly thereon. The lower side of the matrix-box is extended rearwardly and provided with lugs 116 on the under side of such extension. A pintle 117 extends through these lugs and through lugs 118 provided therefor on the bearing-plate 119, whereby said bearing-plate is pivotally secured to the matrix-box. The front portion of this bearing-plate is of increased thickness in position to bear upwardly against the matrix. By this arrangement the upward pressure of the spring-pressed carrier-arm 61 is transmitted, through the enlargement of the bearing-plate, to the matrix and its box, so as to hold it firmly against the top stool 115, and as there is only a small area of contact between the carrier-arm and the bearing-plate inequalities in the surface of said arm are unimportant and do not cause any alteration of the normal relation between the matrix-box and the top stool.

The melting-pot is mounted upon a horizontal arm or bracket 76, pivotally mounted upon the framework so as to swing horizontally. The melting-pot has a raised hollow hub 77 therein, constituting a cylinder in which works a plunger or piston 78. The lower end of this cylinder is connected by a passage-way 79 to a chamber 80 near the side of the melting-pot, with which chamber the jet-orifice 81 communicates directly. This chamber is arranged horizontally and has a pin or plug valve 82 arranged therein to close and open the nipple-orifice. The opposite end of said chamber has an opening therein communicating directly with the hollow interior of the melting-pot. The edge of this opening inside of the valve-chamber is beveled off to constitute a seat for a valve 83, mounted upon the bar 84, which carries the pin or plug valve 82 at the opposite end of said chamber. This bar 84 is mounted in any suitable guides provided therefor in the melting-pot and is reciprocated by means of an arm or crank-pin 85, provided for the purpose. At the forward end of the stroke of said bar the pin or plug valve 82 closes the jet-orifice, while the other valve 83 is removed from its seat to open communication between the valve-chamber and the melting-pot, and thereby permit the molten metal to fill said valve-chamber and the lower end of the cylinder. In the opposite position of the valve-bar the valve 83 closes the opening in the melting-pot and the valve 82 opens the jet-orifice. The said valve-bar is actuated by the same mechanism which actuates the plunger, and their movements are so timed that the downward stroke of the plunger is simultaneous with the opening of the jet-orifice and the lifting of the plunger is simultaneous with the closing of the jet-orifice. The plunger thus constitutes a pump for forcing the molten metal into the mold. The mechanism for accomplishing this operation is as follows: The plunger 78 has an upward extension, which passes through guides extending upwardly from the melting-pot for the purpose. A coiled spring 87 surrounds the upper end of said plunger rod or stem 86 and bears at one end against the guide-supports and at the other against a nut 88, secured on the top end of said plunger-rod, whereby said spring tends to hold said plunger in its uppermost position. Pivotally mounted upon the melting-pot is a horizontal lever 89, one end of which engages the stem 86 of the plunger and the other end of which is connected to a vertical rod 90. Around this vertical rod is a coiled spring 91, whose upper end bears against a shoulder on said rod and whose lower end bears against a stationary part of the frame or bracket, whereby the spring tends to keep said rod normally in its uppermost position. The lower end of said rod extends through the bracket and is enlarged into a head or flange. Mounted in guides provided therefor on the main frame of the machine is a vertically-movable bar 92, whose upper end extends laterally and is bifurcated in position to straddle the vertical rod 90 and engage the enlarged head or flange thereof. This last-mentioned bar 92 is pivotally connected to one end of a lever 93, which is fulcrumed in the main frame and whose other end carries a roller 94 in position to bear against a cam 95, mounted upon the main cam-shaft of the machine or upon a shaft specially provided for the purpose. By this arrangement the coiled spring 91 causes said roller 94 to bear against the cam, whereby the cam is enabled to reciprocate the plunger of the pump. As hereinbefore stated, the pump-valves are operated by means of a crank 85. This crank-arm is mounted on a rock-shaft 96, to which is affixed a second crank-arm 97, which is connected by a link 98, containing a turnbuckle 99 or other means for varying its length, to a bar 100, arranged to slide vertically in the frame of the bracket. The lower end of this bar is bent horizontally to form a bearing-face for the end of a pin 101, which fits loosely in a hole provided therefor in the frame of the machine. The lower end of this pin rests upon the top side of a lever 102, fulcrumed in the main frame and carrying a roller 103, arranged to bear against a cam 104, provided therefor on the cam-shaft or upon a shaft specially provided for the purpose.

In order to keep the roller 103 in contact with its cam, a spring 105 is arranged to exert a downward pressure thereon. This spring surrounds a rod 106, which is vertically movable in the bracket-frame and bears at its upper end against said bracket-frame and bears at its lower end against a shoulder or adjustable nut 107, mounted on said rod. The lower end of said rod 106 bears against the laterally-extending portion of the bar 100, whereby the pressure of the spring is transmitted through said rod and said bar to the removable pin 101 and thence directly to the cam-lever 102. The upper end of the removable pin 101 and the inner edge of the lower end of the bar are both beveled off, so that when the melting-pot bracket is swung toward the mold the edge of the bar will ride up over the end of the pin 101, and thus automatically make an operative connection therewith. When the melting-pot bracket is swung away from the mold, the connection between the pump-valve and the operating mechanism is automatically disengaged.

In order to render the connection of the pump-valves to the driving mechanism inoperative, even when the melting-pot is in proper relation to the mold, it is only necessary to remove the power-transmitting pin, which removal is effected merely by lifting the pin out of the hole provided therefor.

In order to adjust the jet-nozzle to its proper position in alinement with the mold, the pivot or fulcrum of the melting-pot is made in the form of an eccentric 108, which is itself pivotally mounted on a spindle or shaft 109 provided therefor. This shaft is provided with a hand-lever or arm 110, whereby it may be turned to any desired position, thereby shifting the entire melting-pot bracket toward or away from the center of the shaft. This eccentric thus constitutes the means for adjusting the jet-nozzle longitudinally or in the direction of the movement of the mold-cover.

Obviously the constructions hereinbefore described admit of considerable modification, and I do not wish to restrict myself to such specific constructions.

What I claim is—

1. A type-casting machine comprising a frame, a mold therein, a reciprocating mold-cover, and actuating mechanism, said actuating mechanism comprising a cam-shaft and a sectional arm pivotally mounted upon a movable fulcrum and arranged to be actuated by said cam-shaft, said arm being connected to said cover and the sections thereof being extensible to regulate the stroke of the mold-cover.

2. In a type-casting machine, a frame, a mold therein comprising a reciprocating mold-cover and actuating mechanism, a sectional arm pivotally mounted at one end upon a movable fulcrum and connected to said mold-cover and arranged to be actuated by said actuating mechanism, and means for extending said sections and varying the alinement of said sections with reference to each other to regulate the stroke and the limiting positions of the mold-cover.

3. A type-casting machine comprising a frame, a mold therein, a reciprocating mold-cover, and actuating mechanism, a sectional arm pivotally mounted at one end upon a movable fulcrum and connected to said mold-cover and arranged to be actuated by said actuating mechanism, and means for varying the alinement of said sections with reference to each other.

4. A type-casting machine comprising a frame, a mold mounted therein, a reciprocating mold-cover, actuating mechanism, and an arm arranged to be actuated by said actuating mechanism and connected to said mold-cover to actuate the same, said actuating mechanism comprising a shaft having two cams and said arm having a yoke arranged to coöperate with said cams.

5. A type-casting machine comprising a frame, a mold mounted therein, a reciprocating mold-cover, actuating mechanism, and an arm arranged to be actuated by said actuating mechanism and connected to said mold-cover to actuate the same, said actuating mechanism comprising a shaft having two cams and said arm having a yoke arranged to coöperate with said cams, said arm being made of two sections adjustable lengthwise relative to each other.

6. A type-casting machine comprising a frame, a mold mounted therein, a reciprocating mold-cover, actuating mechanism, and an arm arranged to be actuated by said actuating mechanism and connected to said mold-cover to actuate the same, said actuating mechanism comprising a shaft having two cams, and said arm having a yoke arranged to coöperate with said cams, said arm being made of sections and the means for connecting said sections being adapted to vary the alinement thereof.

7. A type-casting machine comprising a frame, a mold mounted therein, a reciprocating mold-cover, actuating mechanism, and an arm arranged to be actuated by said actuating mechanism and connected to said mold-cover to actuate the same, said actuating mechanism comprising a shaft having two cams and said arm having a yoke arranged to coöperate with said cams, said arm being made of sections and means for extending said sections longitudinally and for varying the alinement thereof.

8. A type-casting machine comprising a frame, a mold mounted therein, a reciprocating mold-cover, actuating mechanism, comprising a cam-shaft, an arm arranged to straddle said cam-shaft so as to be actuated thereby and connected to said mold-cover to actuate the same, and a lever fulcrumed in said frame, said actuating-arm being pivotally mounted on said lever.

9. A type-casting machine comprising a frame, a mold mounted therein, comprising a reciprocating mold-cover, and actuating mechanism, an arm arranged to be actuated by said actuating mechanism and connected to said mold-cover to actuate the same, and a lever fulcrumed in said frame in position to be operated by the foot of the attendant, sai actuating-arm being pivotally mounted on said lever.

10. A type-casting machine comprising a frame, a mold mounted therein comprising a reciprocating mold-cover, and actuating mechanism, said mold-cover having a slot extending vertically therethrough, an arm arranged to be actuated by said actuating mechanism and connected to said mold-cover to actuate the same and a spring-pressed lever fulcrumed in said frame in position to be operated by the foot of the attendant, said actuating-arm being extensible and pivotally mounted on said lever.

11. A type-casting machine comprising a frame, a mold mounted therein, a reciprocating mold-cover, and actuating mechanism, said mold-cover having a slot extending vertically therethrough, an arm arranged to be actuated by said actuating mechanism and connected to said mold-cover to actuate the same, and a lever fulcrumed in said frame in position to be operated by the foot of the attendant, said actuating-arm being pivotally mounted on said lever.

12. A type-casting machine comprising a frame, a mold mounted therein, a reciprocating mold-cover, and actuating mechanism, an arm arranged to be actuated by said actuating mechanism and connected to said mold-cover to actuate the same, and a lever fulcrumed in said frame, in position to be operated by the foot of the attendant said actuating-arm being pivotally mounted on said lever.

13. A type-casting machine comprising a frame, a mold mounted therein, a reciprocating mold-cover, and actuating mechanism, said mold-cover having a slot extending therethrough, an arm arranged to be actuated by said actuating mechanism and connected to said mold-cover to actuate the same, and a lever fulcrumed in said frame, in position to be operated by the foot of the attendant said actuating-arm being extensible and pivotally mounted on said lever.

14. In a type-making machine, a frame, a separable mold mounted thereon and having a receprocating mold-cover and guides for said mold-cover, said guides comprising tapering gibs arranged on opposite sides of said mold-cover and wedges intervening between said gibs and said frame.

15. In a type-casting machine, a frame, a separable mold mounted thereon and having a reciprocating mold-cover and guides for said mold-cover, said guides comprising gibs arranged lengthwise of said mold-cover on opposite sides thereof, adjustable wedges intervening between said gibs and said frame and means for adjusting said wedges.

16. In a type-casting machine, a frame, a separable mold mounted thereon and having a reciprocating mold-cover and guides for said mold-cover, said guides comprising gibs arranged lengthwise of the mold-cover on opposite sides thereof and adjustable wedges intervening between said gibs and said frame, said wedges having flanges overlapping the ends of said gibs and provided with adjusting-screws arranged to coöperate with said gibs.

17. In a type-casting machine, a frame and a reciprocating mold-cover comprising a block whose lowermost surface is its bearing-surface, said block being transversely grooved in its under surface near its outer end and having a shoulder-block removably secured therein, and adjustable stops mounted on said block in position to bear against a stationary portion of the frame.

18. In a type-casting machine, a melting-pot having a jet-nozzle, a valve for controlling said nozzle, actuating mechanism for said casting-machine, and means for transmitting motion from said mechanism to said valve, said transmitting mechanism comprising a vertically-movable member and a removable piece resting loosely thereon and arranged to constitute an essential element thereof.

19. In a type-casting machine, a melting-pot having a jet-nozzle, a valve for controlling said nozzle, actuating mechanism for said casting-machine, and means for transmitting motion from said mechanism to said valve, said transmitting mechanism comprising a lever arranged to coöperate with a cam on the driving mechanism, a rock-shaft arranged to actuate the valve, a spring-actuated bar operatively connected to said rock-shaft, and a removable pin interposed between the lever and the bar.

20. In a type-casting machine, a melting-pot mounted upon a swinging support and having a jet-nozzle, a valve for controlling said nozzle, actuating mechanism for said casting-machine, and means for transmitting motion from said mechanism to said valve, said transmitting mechanism comprising a lever arranged to coöperate with a cam on the driving mechanism, a rock-shaft arranged to actuate the valve, a spring-actuated bar operatively connected to said rock-shaft and a pin resting on said lever and extending loosely through a hole in the frame, said pin and said bar being located and adapted to constitute an automatically-acting connecting device.

21. A type-casting machine comprising a frame, a mold and a melting-pot, said frame having a shaft journaled therein and arranged to be rotatably adjusted, and the melting-pot being pivotally mounted eccentric to said shaft on a piece movable with said shaft whereby said melting-pot is adjustable relative to said mold.

22. A type-casting machine comprising a frame, a mold and a melting-pot, said frame having an eccentric journaled therein and the melting-pot being pivotally mounted on said eccentric whereby it is adjustable lengthwise of the mold and said eccentric being provided with a hand-lever for manipulating it.

23. In a type-casting machine a matrix-box and a bearing-plate pivotally mounted thereon in position to intervene between the matrix and the piece on which it slides.

24. In a type-casting machine, a frame, a hand-lever thereon, a thrust-bar mounted on said lever to bear against the matrix-box, and a spring arranged to maintain pressure on said lever.

25. In a type-casting machine, a frame, a hand-lever thereon, a thrust-bar mounted on said lever to bear against the matrix-box, a spring arranged to maintain pressure on said lever, and an adjustable back-stop for said lever.

26. In a type-casting machine, a frame, a hand-lever thereon, a thrust-bar mounted on said lever to bear against the matrix-box, a spring arranged to maintain pressure on said lever, and an adjusting-screw mounted on said frame in position to regulate the tension of the spring.

27. In a type-casting machine, two hand-levers arranged to be grasped with a single hand, a matrix-box carrier mounted on one of said levers and adapted to receive a matrix-box, a thrust-bar mounted on the other lever and arranged to bear against the matrix-box, and springs arranged to maintain pressure on said levers.

St. Louis, Missouri, April 20, 1903.

HERBERT STERLING WILSON.

Witnesses:
JAMES A. CARR,
JULIA B. MEGOWN.